United States Patent [19]

Chang

[11] Patent Number: 5,103,885
[45] Date of Patent: Apr. 14, 1992

[54] CABLE CHAIN FOR AUTOMOBILE TIRE

[76] Inventor: Keun I. Chang, 12328 NW. Barnes Rd., #439, Portland, Oreg. 97229

[21] Appl. No.: 472,213

[22] Filed: Jan. 29, 1990

[51] Int. Cl.$^5$ ............................................. B60C 27/08
[52] U.S. Cl. .................................... 152/222; 152/221
[58] Field of Search ........... 152/221, 222, 223, 225 R, 152/226, 231, 232, 239, 240, 243, 187, 191

[56] References Cited

U.S. PATENT DOCUMENTS

| 3,025,901 | 3/1962 | Bengert | 152/239 |
| 4,660,611 | 4/1987 | Gockley et al. | 152/231 |
| 4,830,078 | 5/1989 | Chang | 152/222 |

FOREIGN PATENT DOCUMENTS

| 208209 | 8/1989 | Japan | 152/221 |
| 314613 | 12/1989 | Japan | 152/221 |

Primary Examiner—Michael W. Ball
Assistant Examiner—Francis J. Lorin
Attorney, Agent, or Firm—Dellett, Smith-Hill and Bedell

[57] ABSTRACT

A cable chain for mounting on an automobile tire to provide improved traction in snow or ice conditions, comprises two longitudinal cables and a plurality of transverse cables each having two ends attached to the two longitudinal cables respectively. When the longitudinal cables are mounted on the tire and extend substantially peripherally thereof at opposite respective sides of the tire, the transverse cables extend across the tire tread. Traction sleeves are mounted on at least one of the transverse cables, and each traction sleeve has multiple lateral faces each having two substantially planar edge regions and a recessed portion therebetween.

9 Claims, 1 Drawing Sheet

CABLE CHAIN FOR AUTOMOBILE TIRE

BACKGROUND OF THE INVENTION

This invention relates to a cable chain for an automobile tire.

The conventional cable chain for mounting on an automobile tire to provide additional traction in snow or ice conditions comprises two longitudinal metal cables, the length of each of which is a approximately equal to the circumference of the tire, and several shorter cables each of length about equal to the width of the tire. The shorter cables are attached to the longer cables so that the longer cables can be placed in spaced parallel relationship at a distance from each other substantially equal to the length of the shorter cables. In use, the cable chain is wrapped around the tire of a vehicle and the two ends of each longer cable are attached together, so that the shorter cables extend across the tire tread. Each shorter cable is provided with multiple traction sleeves for digging into the snow or ice and providing improved traction.

U.S. Pat. No. 4,830,078 issued May 16, 1989 to Keun I. Chang discloses a cable chain in which the traction sleeves are substantially square in external cross section. As a result, distinct gripping edges are formed at the periphery of the traction sleeve, for digging into the ice or snow.

SUMMARY OF THE INVENTION

In accordance with a first aspect of the present invention, a cable chain for mounting on an automobile tire to provide improved traction in snow or ice conditions comprises two longitudinal cables and a plurality of transverse cables each attached at opposite respective ends to the longitudinal cables respectively, so that when the longitudinal cables are mounted on the tire and extend substantially peripherally thereof at opposite respective sides of the tire, the transverse members extend across the tread. A plurality of traction sleeves are mounted on at least one of the transverse cables. Each traction sleeve has multiple lateral faces and each lateral face has two substantially planar edge regions and a recessed portion therebetween.

In accordance with a second aspect of the invention, a cable chain for mounting on an automobile tire to provide improved traction in snow or ice conditions comprises two longitudinal cables and the plurality of transverse cables each attached at opposite respective ends to the longitudinal cables respectively, so that when the longitudinal cables are mounted on the tire and extend substantially peripherally thereof at opposite respective sides of the tire, the transverse cables extend across the tire tread. A plurality of traction sleeves are mounted on at least one of the transverse cables, each traction sleeve having multiple lateral faces. Each lateral face has two substantially planar edge regions, so that the traction sleeves are angular. Between each two adjacent traction sleeves there is an idler collar that holds the traction sleeves apart. The maximum external lateral dimension of the idler collar is less than the maximum external lateral dimension of the adjacent traction sleeves.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
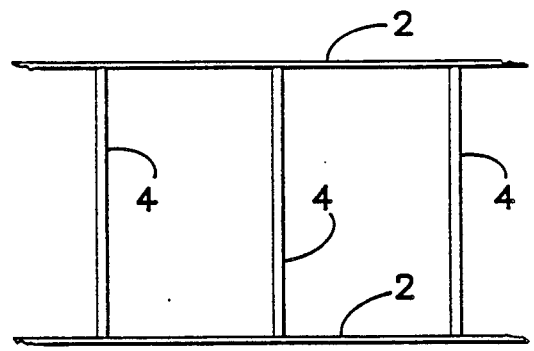
FIG. 1 is a simplified view of a portion of a cable chain comprising two longitudinal cables and transverse members connecting the longitudinal cables.
Figure 3:
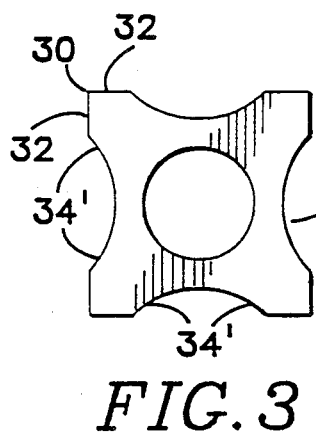
FIG. 3 is an end elevation of a traction sleeve included in the transverse member.
Figure 4:
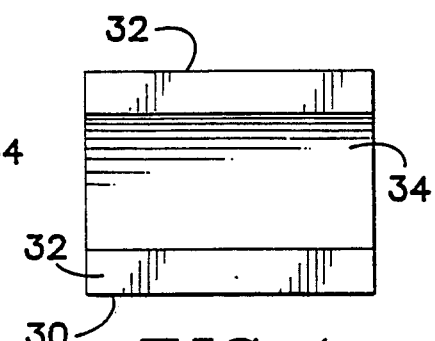
FIG. 4 is a side elevation of the traction sleeve.

The cable chain illustrated in FIGS. 1–4 comprises two longitudinal cables 2 connected together by transverse members 4. Each transverse member is composed of a transverse cable 12 and connectors 14 that are crimped onto the longitudinal cables 2 respectively and onto opposite ends of the transverse cable 12. Cable 12 is made of a bundle of fine metal strands twisted together, with thicker wires wrapped helically around the bundle of strands for increased strength. Each transverse member also comprises two sets of rollers 16 fitted on the cable and two sets of traction sleeves 18 fitted on the cable between the two sets of rollers. A hard rubber ring 20 is fitted on the cable between the rollers 16 and the connectors 14.

A roller 22 is fitted on cable 12 between the two sets of traction sleeves. Elements 16, 18 and 22 are rotatable freely on cable 12 and are slidable along cable 12, the total length of elements 16, 18 and 22 being less than the length of cable 12 between rings 20. Thus, transverse member 4 is flexible. When the cable chain is mounted on a tire, rollers 16 are able to roll against the side wall of the tire, preventing damage to the tire by the cable. The rollers also insure that the traction sleeves remain in position over the tread of the tire. Rubber rings 20 protect the tire wall from the ends of the connector 14.

Each traction sleeve, when viewed in cross section, has four equiangularly spaced 90° corners 30, each defined between two substantially flat edge regions 32. Thus, the traction sleeve has two pairs of opposite corners, each pair of corners defining a common plane. The lateral surfaces of the traction sleeve between the edge regions 32 are not flat but are concave, so that the traction sleeve has a groove 34 in each lateral surface. Each groove 34 has surface regions 34' that are substantially parallel to the common plane defined by the adjacent corner 30 of the traction sleeve and the opposite corner. Therefore, the presence of the grooves results in the corners of the traction sleeve being able to dig more strongly into ice or snow than do the corners of the traction sleeves described in U.S. Pat. No. 4,830,078, thus providing improved traction.

Figure 2:
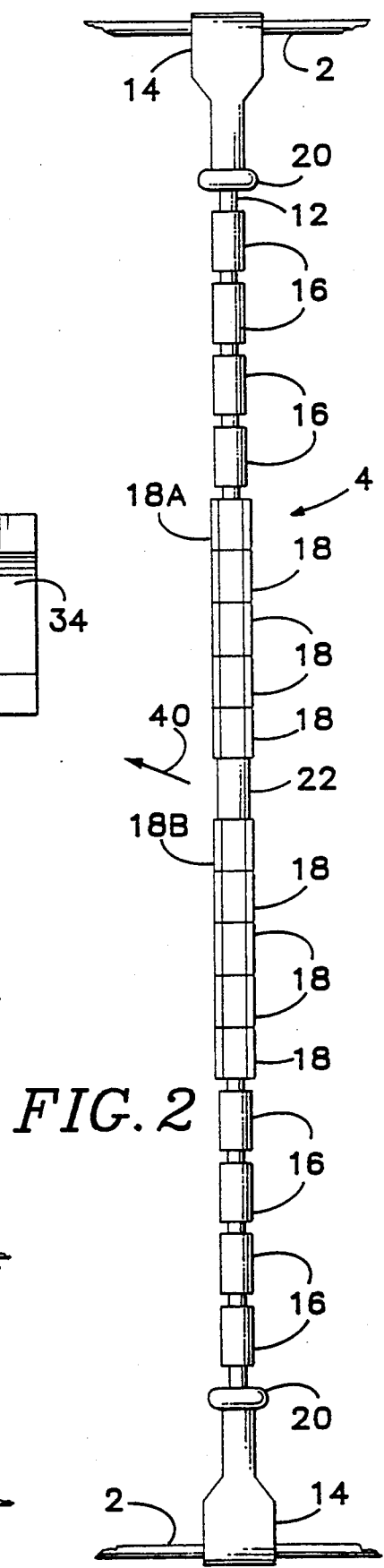
FIG. 2 is an enlarged view of one of the transverse members.

If all the traction sleeves are in the same angular position on the transverse cable, and the vehicle starts to slide in the direction illustrated by the arrow 40 in FIG. 2, i.e. a sliding movement having a component directed transverse to the path of movement of the vehicle, a corner of each of the sleeves 18A and 18B will tend to dig into the snow or ice at an end of the sleeve and resist the transverse sliding movement. However, the other traction sleeves will contribute little to preventing transverse sliding movement because their ends are covered by adjacent sleeves.

Figure 5:
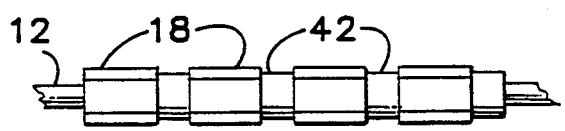
FIG. 5 is a partial view of a modified form of transverse member.

In the modified transverse member shown in FIG. 5, a metal idler collar 42 is placed between each two adjacent traction sleeves and holds the traction sleeves apart. The idler collars are annular in section, and the external diameter of the idler collar is shorter than the diagonal of the cross-section of the traction sleeves. In this fashion, the ends of the traction sleeves are not covered and therefore are able to contribute to resisting transverse sliding movement of the vehicle.

The corners 30 of the traction sleeves are subject to wear by contact with the road surface in areas where there is no snow or ice. In order to resist wear of the traction sleeves against the road surface, the traction sleeves are preferably made of mild steel, for example a 0.11 through 0.22% carbon steel, that has been surface hardened by cementation heat treatment. The cementation heat treatment results in the steel of the traction sleeve becoming rather brittle, and to prevent fracture of the traction sleeve in use the hardening is carried out only to a depth of about 0.6-0.9 mm. The hardening results in the traction sleeve having a hardness in the range from about 53 to about 57 on the C scale when measured using a Rockwell hardness tester. This is such that the traction sleeve cannot readily be abraded using a conventional file.

Figure 6:
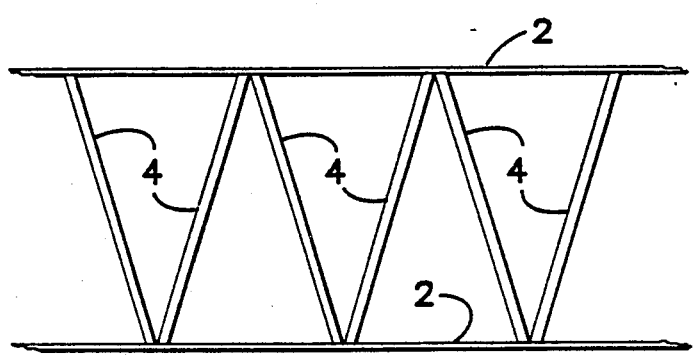
FIG. 6 is a simplified view of a portion of a second cable chain.

FIG. 6 shows a preferred form of cable chain, in which the transverse members are at an acute angle to the longitudinal cables and are in two sets at an acute angle to each other. This arrangement is particularly advantageous in the case of the transverse member shown in FIG. 4, since for every direction, the ends of the traction sleeves on at least one set of transverse members will resist sliding.

It will be appreciated that the invention is not restricted to the particular embodiment that has been described and illustrated, and that variations may be made therein without departing from the scope of the invention as defined in the appended claims and equivalents thereof.

I claim:

1. A cable chain for mounting on an automobile tire to provide improved traction in snow or ice conditions, comprising:

first and second longitudinal cables, a plurality of transverse cables each having first and second ends attached to the first and second longitudinal cables respectively, so that when the longitudinal cables are mounted on the tire and extend substantially peripherally thereof at opposite respective sides of the tire, the transverse cables extend across the tire tread, and a plurality of traction sleeves mounted on at least one of the transverse cables, each traction sleeve having multiple lateral faces and each lateral face having two substantially planar edge regions that meet edge regions of adjacent lateral faces of the sleeve at respective angular edges of the sleeve, and each lateral face of the sleeve has a recessed portion between its two edge regions.

2. A cable chain according to claim 1, wherein the two edge regions of each lateral face are substantially coplanar.

3. A cable chain according to claim 1, wherein the traction sleeve is made of surface hardened steel.

4. A cable chain according to claim 3, wherein the sleeve is hardened to a depth in the range from about 0.6 mm to about 0.9 mm.

5. A cable chain according to claim 1, wherein the transverse cables are in first and second sets, with transverse cables of the first set alternating along the longitudinal cables with transverse cables of the second set, the cables of each set being parallel to each other and the cables of the first set being inclined to the cables of the second set.

6. A cable chain according to claim 1, wherein each traction sleeve has four lateral faces, whereby each angular edge of the sleeve defines an angle of about 90°.

7. A cable chain according to claim 1, further comprising an idler collar mounted on the transverse cable between each two adjacent traction sleeves, the maximum external lateral dimension of the idler collar being smaller than the maximum external lateral dimension of the adjacent traction sleeves.

8. A cable chain according to claim 2, wherein the recessed portion in each lateral face of each traction sleeve is shaped as a segment of a cylinder.

9. A cable chain according to claim 1, wherein each traction sleeve has four lateral faces, whereby the sleeve has two pairs of opposite angular edges and the two angular edges of each pair define a common plane, and wherein the recessed portion of each lateral face has two surface regions that are respectively adjacent the planar edge regions of the lateral face and are substantially parallel to said common planes respectively.

* * * * *